United States Patent [19]
Marvy

[11] Patent Number: 5,463,172
[45] Date of Patent: Oct. 31, 1995

[54] WASTE DISPOSAL PROCESS

[75] Inventor: Alain A. Marvy, Saskatchewan, Canada

[73] Assignee: Cigar Lake Mining Corporation, Saskatchewan, Canada

[21] Appl. No.: 216,727

[22] Filed: Mar. 23, 1994

[51] Int. Cl.⁶ ........................................ B09B 3/00
[52] U.S. Cl. .................... 588/252; 405/128; 588/250
[58] Field of Search .................... 588/250, 252, 588/256, 257; 405/128, 129, 266, 267

[56] References Cited

U.S. PATENT DOCUMENTS

| | | | |
|---|---|---|---|
| 4,576,513 | 3/1986 | Lindorfer et al. | 588/250 |
| 4,859,367 | 8/1989 | Davidovits | 588/252 |
| 5,133,623 | 7/1992 | Gustafson . | |
| 5,322,389 | 6/1994 | Smith | 405/128 |

FOREIGN PATENT DOCUMENTS

| | | |
|---|---|---|
| 766471 | 9/1967 | Canada . |
| 1210940 | 9/1986 | Canada . |
| 2023494 | 2/1991 | Canada . |
| 2042599 | 4/1991 | Canada . |
| 2076871 | 9/1991 | Canada . |
| 1312208 | 1/1993 | Canada . |
| WO91/08845 | 6/1991 | WIPO . |

*Primary Examiner*—David H. Corbin
*Attorney, Agent, or Firm*—Steven P. Shurtz; Willian Brinks Hofer Gilson & Lione

[57] ABSTRACT

A method of disposing hazardous industrial solid waste, preferably mill tailings, which comprises treating the waste to form a paste and pumping the paste to an underwater paste deposit site in a water saturated area, said area providing permanent water cover for the paste and means for controlling the rate of release of contaminants from the paste into the environment, the paste being pumpable and not readily mixable with ambient water at the deposit site.

15 Claims, 2 Drawing Sheets

WASTE DISPOSAL PROCESS

The present invention relates to a method of disposing hazardous industrial solid waste, such as mill tailings resulting from a mining operation, in a paste form exhibiting low permeability in a storage location permanently under water, such as in an excavation under the water table, the paste form providing means of controlling the rate of release of contaminants into the environment.

Mill tailings management is a sensitive public policy issue as it relates directly to environmental impact. Traditional concerns are multiple and deal with an array of problems that stem from the pre-development stage of a mining project, through its operating life, to decommissioning and after decommissioning stages when operators have long gone.

Concerns are being shared by mining companies (and all industrial waste producing companies) that want to display a good corporate citizen attitude, regulators that endorse governments' responsibilities and the public whose concern is largely with the long term and future generations issues. Pressure has been increasingly felt by mining companies to innovate and find new ways of dealing with tailings management to reduce further the potential of risk to people and to the environment.

It is known that waste can be pumped, as a slurry or paste, for deposit in, eg. an underground salt cavern or earth formation fracture. However these and other known disposal methods are not designed to achieve substantial containment of waste contaminants in water saturated conditions. Such conditions are prevalent in many areas and a method suitable for use in such areas would be beneficial.

The environmentally acceptable disposal of industrial waste, including mill tailings, poses serious challenges, especially when for example the tailings comprise acid leached debris and/or radioactive material. It is an object of this invention to provide an environmentally acceptable disposal method for hazardous industrial solid waste.

SUMMARY OF THE INVENTION

The invention provides a method of disposing hazardous industrial solid waste, preferably mill tailings, which comprises treating the waste to form a pumpable paste and pumping the paste to an underwater paste deposit site in a water saturated area. The paste form provides a means of controlling the rate of release of contaminants into the surrounding environment. The paste is not readily mixable with ambient water in the storage area. If the waste comprises mill tailings which are leached ground ore, such are neutralized to produce neutralized tailings prior to forming the paste.

The paste preferably comprises solids and liquid fractions, the solids fraction being, in at least 15% by weight of the solids fraction, particles less than 20 μm in diameter and the liquid fraction being adjusted to provide, when mixed with the solids fraction, a paste density compatible with pumping. The paste is also preferably made to have a permeability of $10^{-6}$ cm/sec or less at deposition time. The deposit site is preferably an excavation under the water table (or under a natural water body) and may be capped after completing deposit of the paste.

A binding agent may be added to the paste prior to the paste being deposited in the deposit site such that the paste will become a hardened mass after deposit in the storage area. Clay may also be added to the paste, prior to the paste being deposited in the deposit site, in sufficient quantity to act as a heavy ion contaminant barrier.

The inventive method is considered to have particular advantage when used in disposal of radioactive and/or sulphide mineral containing tailings.

DESCRIPTION OF DRAWINGS OF PREFERRED EMBODIMENTS

In figures which illustrate aspects of preferred embodiments of the present invention:

DETAILED DESCRIPTION OF PREFERRED EMBODIMENTS

The present invention arose in the context of developing the Cigar Lake uranium deposit in Saskatchewan, Canada. Acid leached uranium ore tailings from the deposit are chemically complex and physically composed of fine particles resulting from grinding and leaching the ore and neutralizing acidic liquid effluent. The invention has resulted from efforts to address carefully environmental concerns and health and safety aspects relating to the tailings handling process as this product is radioactive. The invention in a preferred, narrow aspect involves a combination of technical considerations including, but not limited to the following: production of tailings which have properties that would meet geotechnical and rheological preset characteristics so that they can be handled and disposed of in a safer manner; and designing a placement method to address current operating concerns, such as direct effect on the biosphere (direct emissions), freeze-thaw cycle and potential radiation exposure (short and long term effects).

The Cigar Lake milling process is based on acid leaching to dissolve uranium. Downstream the process is targeted at selectively recovering uranium from other elements that have dissolved during the leaching process. Prior to being leached the ore is ground down to 150 micron (D80). Waste streams are composed of solids (leach residue) and liquids (raffinate), which are neutralized to produce neutralized tailings. The aim is to transform tailings into a suitable form that would be compatible with the targeted characteristics.

The tailings are prepared into a paste after neutralization. Neutralization is optional depending on the nature of the tailings. "Paste" when used herein is defined as a stable mixture of solids and fluid, preferably water, having a certain viscosity, still amenable to pumping. The hydraulic properties of the paste when it flows in a pipe are those of a Bingham fluid which moves like a plug pushed away by the action of pump pressure. A number of conditions regarding paste composition must be met for the paste to flow as described above.

One condition is that a sufficient quantity of fines must be present in the solid fraction; at least 15% (by weight) of the solid particles having a size of less than 20 microns. The fines bind the liquid phase in the paste matrix and act as a lubricant to facilitate pumping. The overall grain size distribution preferably should not be too widespread, and is most preferably regular. If the tailings particles from the milling process do not meet these objectives, it is usually feasible to reconstruct a solid phase, eg. by making a finer grind of waste solid particles, or by adding fines such as clay, cement, etc., to meet them.

Figure 1:
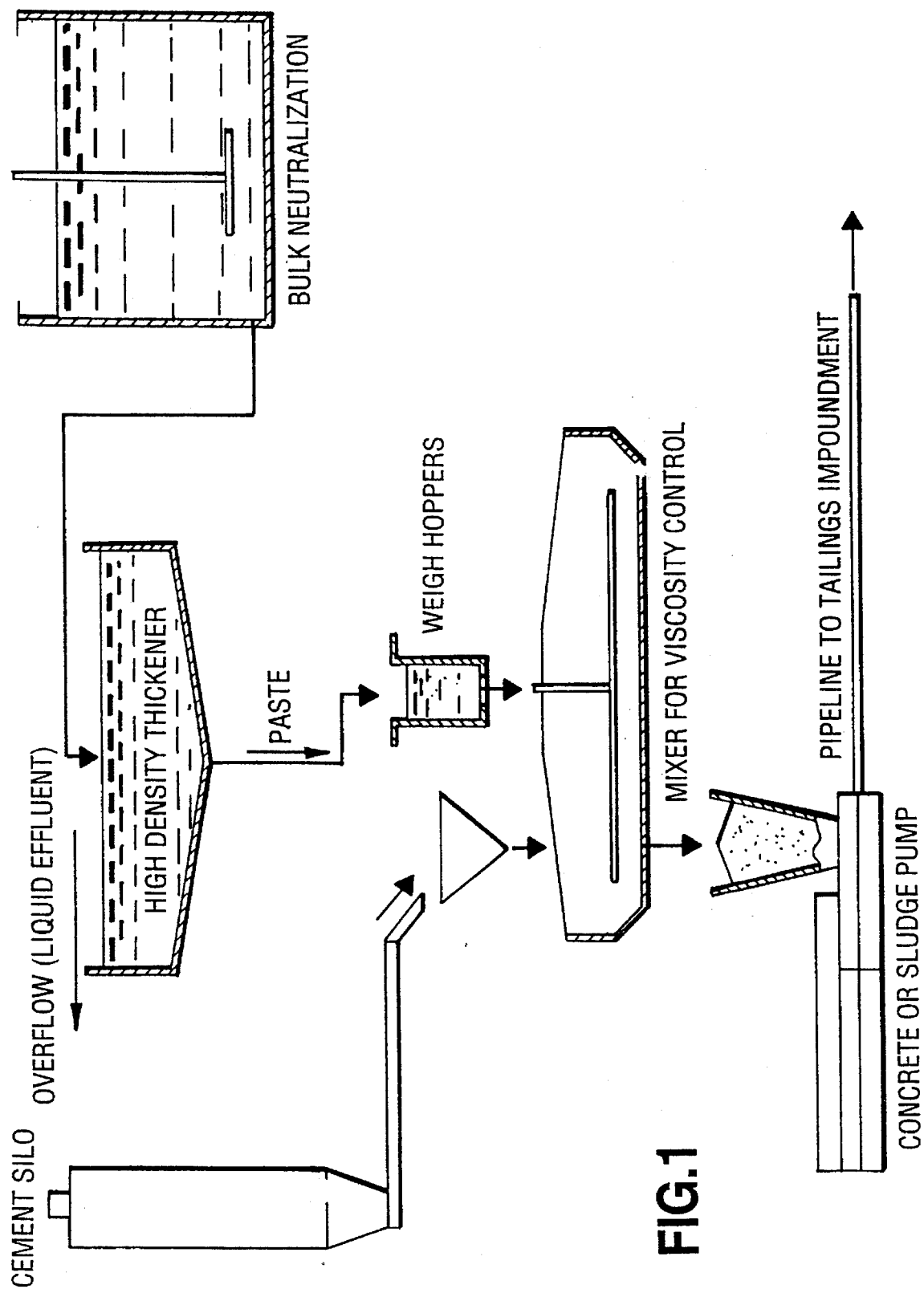
FIG. 1 is a schematic diagram of a method of making a pumpable paste.

The liquid-solid ratio of the paste is set so that little or no bleeding out of free water will result. Also, if pumping of the paste is discontinued, sanding out of solids will not occur. In view of these objects, control of water content in the paste is important. Different approaches may be used to achieve such control. One method is to use high density thickener technology (see FIG. 1) that can lead to obtaining the recommended solid density and final paste viscosity. Another method is to remove excess water from the tailings streams (leach residues or chemical precipitates or both) by mechanical means (eg. filtration) and then recombining them with make-up water in a controlled fashion targeted at obtaining a solid density compatible with making pumpable paste. The final solid density may vary depending on the mineralogical and chemical nature of the solids, the solids grain size and the grain size distribution. In the case of the Cigar Lake tailings, the solid density by weight may range from about 35% up to about 60% based on the ore grade and mineralogy variation.

Figure 2:
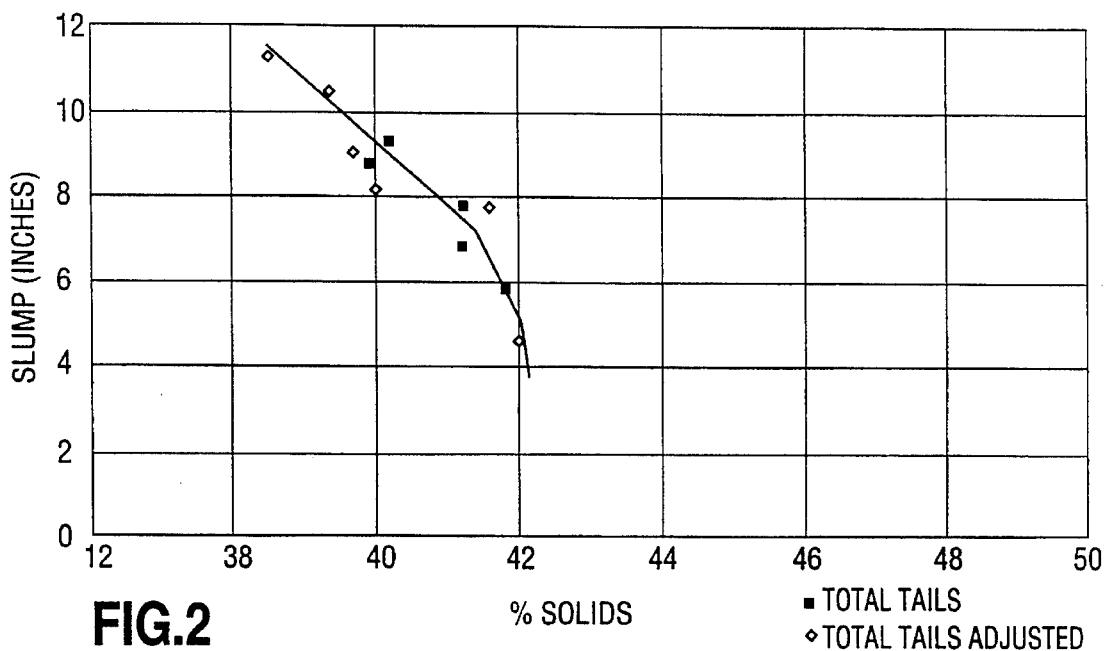
FIG. 2 is a graph of "slump" (indirect measure of viscosity) versus solids content for serveral samples of pastes in accordance with the invention.
Figure 3:
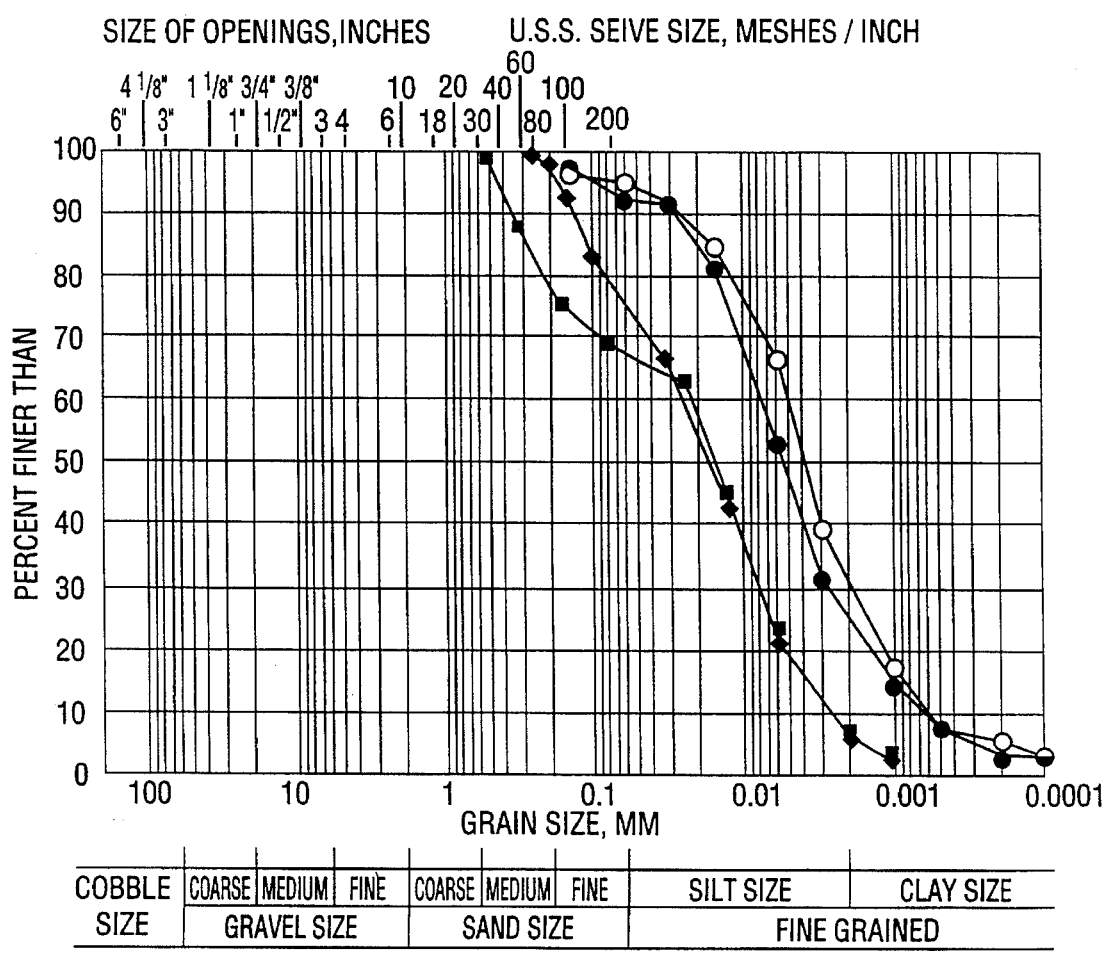
FIG. 3 is a graph of grain size distribution for several samples pastes (combined tailings) in accordance with the invention.

Paste viscosity may be measured indirectly using the "slump test", a test well known and used in the concrete industry to assess pumpability of concrete mix or to determine the specifications that should be given to a pumping system to handle a specific mix. This will give a good assessment of the pumpability of the paste. FIG. 2 illustrates the application of the slump test to sample test tailings (paste). FIG. 3 illustrates grain size distribution in sample test tailings (paste). Note that such does not mean that tailings having different grain size distribution cannot be processed into paste with similar properties. The mineralogical nature of solids can also impact on the paste viscosity in relation to the percentage of solids.

Preferably, positive displacement pumps can be used to move the paste along a pipeline to a disposal storage site, although the paste may be transported by alternate means, eg. vehicles, to near the site and then pumped into the site. The rheology of the paste would allow the paste not to sand out in pipes or to spill far away from a broken line. Hydraulic transportation associated with the material rheological characteristics provide for considerable reduction of spill likelihood and potential negative environmental consequences and, as a result, workers would be better protected from radiation exposure during such events. Should a spill occur, clean up would be quick (small volume in a limited area) with little or no short term/long term consequences.

It is noteworthy that pumping of the paste through a pipeline need not be continuous, ie. pumping can be discontinued, as the paste will not sand out and plug the line. This allows for large operating flexibility and/or a batch transportation process. Furthermore, no flushing of the pipeline is required to clean it up after each pumping sequence.

The inventive method requires the paste to be placed down under water cover. Due to the consistency of the paste, providing physical stability, it will not mix readily within the water column. Paste that flows out of the pipeline will experience little intermingling with water. Potential for intermingling can be reduced by keeping the extremity of the paste pipeline immersed into already deposited paste and by continuing positive displacement of paste as pumping proceeds. The previously deposited paste would then act as a cover.

Mill tailings may be potentially acid generating because of the presence of residual sulfur bearing minerals that can decay into $H_2SO_4$ under oxidizing conditions (above ground level storage). Storing these tailings under permanent water cover provides for less oxygen being available to combine and generate sulfuric acid. These tailings may also contain heavy metals that have the potential to leach out, this leaching process being further enhanced by acidic conditions, should acid generation take place.

By placing a low permeability tailings mass (such as the "paste" form having a permeability estimated at $10^{-6}/10^{-7}$ cm/sec or less) under water, the potential for contaminants to leach out is further reduced because of the much smaller advective water flux through the tailings mass. Leaching out of contaminants is then mostly governed by diffusion, a very slow process, that minimizes and controls the contaminants loading to the environment in the long term. In any case, the rate of release of contaminants will also be governed by the site specific surrounding rock hydraulic characteristics: in a rock environment more permeable than the tailings paste, the paste would act as a plug in the underground water system; in tighter rock, ground water flow would be further reduced. The chemical stability in the long term can be obtained by storing the paste in such form under water. However, an enhancement could be to solidify the tailings paste by mixing a binding agent with it (eg. cement), solidification taking place under water. Also, a clay component such as bentonite may be added that would act as an internal contaminant barrier adsorbing heavy ions. If enhanced physical stability or increased mechanical strength is required, cement can be added, for example, to the top layer so that it could withstand the dead weight of a cap (backfill for instance).

The disposal storage location is preferably an excavation in the ground beneath the water table, wherein the paste mass can be capped during reclamation. The storage location is selected, preferably, based on geological and hydrological local properties. It is obvious that a totally watertight formation would qualify without restriction. Formations with higher or lower hydraulic conductivity than the paste may also qualify depending on the underground water regime characteristics.

The high degree of containment achieved by the inventive process protects workers from exposure to radiation under routine operating conditions. The only circumstances in which workers may be potentially exposed are during upset conditions such as a spill event and the associated clean up. Any breaking of the integrity of the containment of the pumping system can be pressure monitored accurately, limiting the spillage of material to small quantities that would swell off the broken pipe and accumulate without spreading away. Clean up and repair to the line would be done quickly. As a consequence, exposure time and radioactive source volume would be kept to a minimum, thus allowing for reduction of workers' potential radiation exposure.

The environmental benefits are at least fourfold. Firstly, there is the above mentioned control of spillage and easy clean up occasioned by the paste form. The high viscosity of the paste, which has little tendency to bleed water, is advantageous to reducing the consequences of a spill.

Secondly, if it is elected to enhance the paste characteristics in storage by adding or mixing a binding agent that would contribute to solidify the tailings (eg. cement), this would increase chemical and physical stability of the tailings.

Thirdly, in comparison to the current practice for placing tailings in impoundments, underwater deposition allows for (in the case of uranium ore tailings): elimination of radioactive-and/or heavy metal-containing dust; large reduction of radon gas emanation rate; water cover gamma rays shielding effect; and suppression of potential for freeze-thaw cycles in the tailings mass where applicable in nordic regions.

Fourthly, the paste form and its enhanced density prevent grain segregation, ensuring a more homogenous hydraulic behavior of the tailings mass. Same or better results can be achieved when adding cement. Permeability of the paste is also variable depending on the particles size, but is always expected to be low enough so that contaminant transport from the tailings to the environment would mainly be controlled by diffusion. Density and permeability factors contribute to making the paste environmentally friendly.

There are several long term factors relevant to the present inventive method. Firstly, the paste made in accordance with the invention does not segregate when placed under water. The tailings mass is more homogeneous in nature and, as a result, hydraulic conductivity is only dependent on the consolidation status. There is no potential for preferential pathways in the tailings mass, as is the case when depositing a slurry with fines being spread away and coarse particles settling at the location of the discharge pipe extremity. In situ hydraulic conductivity is better controlled and is more predictable based on lab permeability test results. Paste produced in a high density thickener could also be characterized as being in an advanced stage toward final consolidation, if compared to a slurry. As a result, hydraulic conductivity is lower, eg. $10^{-6}$ cm/sec or lower, at the time of deposition. This low hydraulic conductivity indicates that no or little advective ground water flow would go through the tailings mass and leach out contaminants. Contaminants would migrate to the ground water system only by diffusion, a very slow process. Consolidation would further reduce the paste permeability in time.

Secondly, storing acid generating material under water inhibits oxidation and stops acid generation. Thirdly, if paste is deposited in a flooded pit, some contaminants, such as radium and arsenic, may be retarded in their migration to the ground water system by adsorption in the rock matrix. Fourthly, the long term physical stability of the paste deposit under the water table is enhanced as erosion force is reduced for the long term.

It will be appreciated by a person skilled in the art that the above description of the preferred embodiments of the invention are only exemplary and that variations may be developed that are within the scope of the teaching of the invention.

What is claimed is:

1. A method of disposing hazardous industrial solid waste which comprises:
   a) treating the waste to form a pumpable paste having hydraulic properties of a Bingham fluid;
   b) pumping the paste to a paste deposit site in a water saturated area, the paste deposit site having a bottom and comprising a body of standing water;
   c) depositing the paste at a location above the bottom of the paste deposit site and under the standing water;
   d) said water saturated area providing permanent water cover for the paste;
   e) said paste being not readily mixable with the standing water at said deposit site, and said paste further providing control of release of contaminants into the environment.

2. The method of claim 1 wherein the step of treating the waste comprises treating mill tailings.

3. The method of claim 2 wherein the step of treating the mill tailings comprises neutralizing leached ground ore to produce neutralized tailings prior to forming the paste.

4. The method of claim 2 wherein the step of treating the mill tailings comprises treating radioactive mill tailings.

5. The method of claim 2 wherein the step of treating the mill tailings comprises treating mill tailings that contain sulphide minerals.

6. The method of claim 2 wherein the step of treating the waste comprises forming a paste comprising solids and liquid fractions, the solids fraction being, in at least 15% by weight of the solids fraction, particles less than 20 µm in diameter and the liquid fraction being adjusted to provide, when mixed with the solids fraction, a paste density compatible with pumping.

7. The method of claim 2 wherein the step of pumping comprises pumping the paste to a deposit site which is an excavation under the water table.

8. The method of claim 2 further comprising the step of adding a binding agent to the paste prior to the paste being deposited in the deposit site such that the paste will become a hardened mass after deposit in the deposit site.

9. The method of claim 8 wherein the step of adding a binding agent comprises adding portland cement.

10. The method of claim 2 further comprising the step of adding clay to the paste, prior to the paste being deposited in the deposit site, in sufficient quantity to act as a heavy ion contaminant barrier.

11. The method of claim 2 wherein the step of treating the waste comprises forming a paste having a water permeability of $10^{-6}$ cm/sec or less.

12. The method of claim 4 further comprising the step of capping the storage area after completing deposit of the paste.

13. A method of disposing mill tailings comprising:
   a) treating the mill tailings to form a pumpable paste having properties of a Bingham fluid, the paste having a solids fraction with at least 15% by weight of particles less than 20 µm in diameter;
   b) pumping the paste to a paste deposit site comprising an excavation under the water table in a water saturated area, the excavation having a bottom and the deposit site comprising a body of standing water;
   c) depositing the paste at a location above the bottom of the excavation and under the standing water;
   d) said water saturated area providing permanent water cover for the paste;
   e) said paste being not readily mixable with the standing water at the deposit site, and further providing control of release of contaminants into the environment by having a water permeability of $10^{-6}$ cm/sec or less.

14. The method of claim 13 wherein the step of treating the mill tailings to form a pumpable paste comprises using high density thickener technology.

15. The method of claim 13 where the step of depositing the paste comprises pumping the paste through a pipeline having a discharge end which is immersed into previously deposited paste, producing positive displacement of paste as pumping proceeds.

* * * * *